(12) United States Patent
Kurihara

(10) Patent No.: US 12,186,906 B2
(45) Date of Patent: Jan. 7, 2025

(54) ROBOT TEACHING DEVICE INCLUDING ICON PROGRAMMING FUNCTION

(71) Applicant: FANUC CORPORATION, Yamanashi (JP)

(72) Inventor: Yuusuke Kurihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 666 days.

(21) Appl. No.: 17/113,565

(22) Filed: Dec. 7, 2020

(65) Prior Publication Data

US 2021/0170586 A1 Jun. 10, 2021

(30) Foreign Application Priority Data

Dec. 9, 2019 (JP) .................. 2019-222394

(51) Int. Cl.
*B25J 9/16* (2006.01)
*B25J 13/08* (2006.01)

(52) U.S. Cl.
CPC ............... *B25J 9/163* (2013.01); *B25J 9/161* (2013.01); *B25J 9/1653* (2013.01); *B25J 13/088* (2013.01)

(58) Field of Classification Search
CPC . B25J 9/163; B25J 9/161; B25J 9/1653; B25J 13/088; B25J 13/06; B25J 9/1656; B25J 9/1602; B25J 9/1664; G05B 2219/32128; G05B 2219/36017; G05B 19/425
See application file for complete search history.

(56) References Cited

U.S. PATENT DOCUMENTS

| | | | |
|---|---|---|---|
| 2008/0317434 A1* | 12/2008 | Nonaka | H04N 5/782 386/341 |
| 2016/0212371 A1* | 7/2016 | Uno | G11B 27/031 |
| 2019/0026015 A1* | 1/2019 | Lee | G11B 27/34 |
| 2021/0146072 A1* | 5/2021 | Krüger | A61M 16/026 |

FOREIGN PATENT DOCUMENTS

| | | |
|---|---|---|
| JP | H08-249026 A | 9/1996 |
| JP | 6498366 B1 | 4/2019 |
| WO | WO-2020012558 A1 * | 1/2020 |

* cited by examiner

*Primary Examiner* — Adam R Mott
*Assistant Examiner* — Elizabeth Rose Neleski
(74) *Attorney, Agent, or Firm* — HAUPTMAN HAM, LLP

(57) ABSTRACT

A robot teaching device generates an operation program of a robot by arranging an instruction icon that represents an operation instruction of the robot. The robot teaching device comprises means for displaying a plurality of marks associated with the instruction icon in a case that the operation instruction includes a plurality of positions, wherein the mark is associated with an identifier of the position.

15 Claims, 12 Drawing Sheets

ROBOT TEACHING DEVICE INCLUDING ICON PROGRAMMING FUNCTION

RELATED APPLICATIONS

The present application claims priority to Japanese Application Number 2019-222394, filed Dec. 9, 2019, the disclosure of which is hereby incorporated by reference herein in its entirety.

BACKGROUND OF THE INVENTION

1. Field of the Invention

The present invention relates to a robot teaching device, and particularly relates to a robot teaching device including an icon programming function.

2. Description of the Related Art

As a technique of creating an operation program of a robot, icon programming to visually create an operation program of a robot by replacing various operation instructions with icons and arranging the icons on a creation screen has been proposed in the related art. A document indicated below is known as a technology related to the icon programing as described above.

JP 6498366 B discloses that a function icon is selected from a first region where function icons are displayed each of which has a state window that displays a setting outline of a parameter of a function configuring a control program for a robot, a function icon which is a replication of the function icon is arranged in a second region, a parameter of a function represented by the function icon arranged in the second region is set, a control program is created on the basis of the function icon and the setting, and appearance of the function icon is changed in accordance with the setting. As an example of the function icon, a passing point icon is disclosed to include a state window that displays a name of a passing point.

SUMMARY OF THE INVENTION

In an operation program of a robot, an operation instruction of the robot includes a position in many cases. In an icon programming environment, it is possible to display the position on an icon representing an operation instruction of a robot, thereby presenting to a user that the operation instruction includes the position. However, in a case of a high-function operation instruction, one operation instruction includes a plurality of positions, and there is a possibility that the plurality of positions will complicate the display of the positions on the icon. Accordingly, there is a demand to visually and simply express that one operation instruction includes the plurality of positions. In addition, in a case of the high-function operation instruction, the position set by a user is corrected and used within a robot program in some cases. In a case that it is not presented to the user that the position is corrected and used, the user mistakenly understands that a robot operation different from the intention is being executed. Accordingly, it is also necessary to be able to visually and simply realize that the position is corrected and used.

On the other hand, in an operation program of a robot, it is desired to execute a program from a specified row in some cases. In a case of a text-based program, there is a method of specifying the row as an execution start row by putting a cursor on the row. In a case of an iconic-based program, it is necessary to select the icon in order to edit a setting value of an instruction icon. Accordingly, when attempting to change an execution row by selecting an icon in the same manner as in the text-based program, there is a possibility that it is not possible to determine whether the selection manipulation is to edit the program or to specify the execution start row. Therefore, the icon selection for editing may involve a change of the execution start row, which may lead to unintentional change of the execution start row. Thus, a method in which an execution row of the program and a selection row for editing can be separately set is also required.

Accordingly, there is a demand for a technology to improve convenience of an icon programming function. One aspect of the present disclosure provides a robot teaching device which generates an operation program of a robot by arranging an instruction icon that represents an operation instruction of the robot, the robot teaching device includes: means for displaying a plurality of marks associated with the instruction icon in a case that the operation instruction includes a plurality of positions, wherein the mark is associated with an identifier of the position.

Other aspect of the present disclosure provides a robot teaching device which generates an operation program of a robot by arranging an instruction icon that represents an operation instruction of the robot, the robot teaching device includes: means for displaying a mark associated with the instruction icon in a case that the operation instruction includes a position, wherein the mark is associated with an identifier of the position; and means for changing a shape of the mark in case that the position is corrected and use.

Another aspect of the present disclosure provides a robot teaching device which generates an operation program of a robot by arranging an instruction icon that represents an operation instruction of the robot, the robot teaching device includes: means for displaying an execution start line on the instruction icon, wherein the execution start line indicates an execution start position in the operation program.

DETAILED DESCRIPTION

Figure 1:
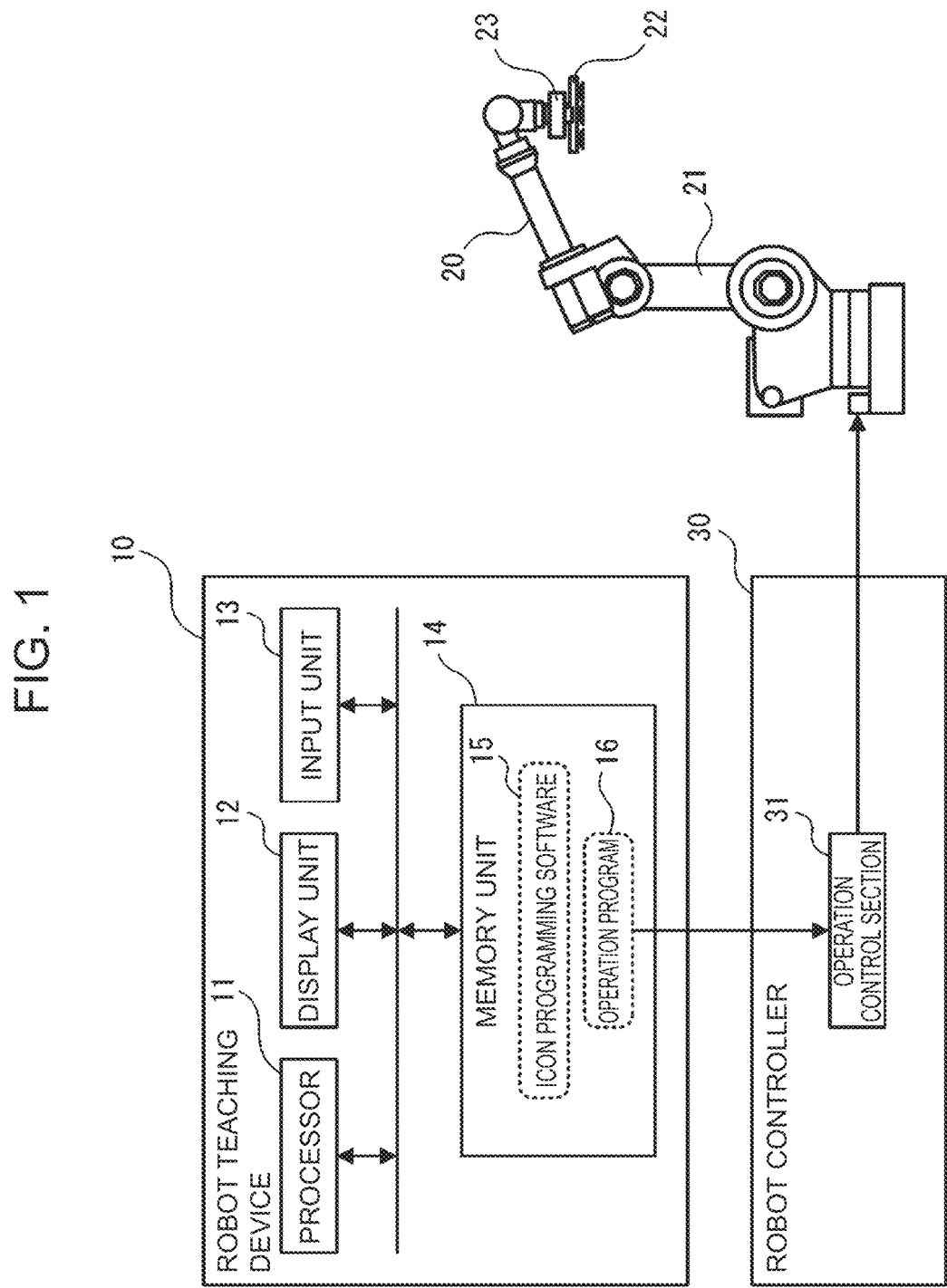
FIG. 1 is a block diagram illustrating a schematic configuration of a robot teaching device according to an embodiment.

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims.

FIG. 1 illustrates a schematic configuration of a robot teaching device 10 according to the present embodiment. The robot teaching device 10 is a computer device including a processor 11, a display unit 12, an input unit 13, a memory unit 14, and the like. The processor 11 includes a central processing unit (CPU), a quantum processor, or the like. The display unit 12 is configured of a liquid crystal display, an organic EL (electro-luminescence) display, or the like. The input unit 13 is configured of a touch panel device, a keyboard, a mouse, and the like, and the memory unit 14 is configured of a semiconductor memory, a magnetic storage device, or the like.

The robot teaching device 10 further includes icon programming software 15 stored in the memory unit 14. The icon programming software 15 is read out and executed by the processor 11 in accordance with information from the input unit 13. The icon programming software 15 is configured of an event driven-type program that displays a programming screen on the display unit 12 and generates an operation program 16 of a robot 20 in accordance with information from the input unit 13.

The generated operation program 16 is transmitted to a robot controller 30 through a wire or wirelessly. The robot controller 30 includes an operation control section 31 that controls operations of a robot mechanism unit 21 and a tool 22 in accordance with the operation program 16. The robot mechanism unit 21 may be an industrial robot such as an articulated robot, a parallel link type robot, or the like, but may be a humanoid or the like. The tool 22 is configured of a suction hand, a gripping hand, a welding tool, a screw fastening tool, or the like in accordance with the task content of the robot 20. The robot 20 may further include a sensor 23. The sensor 23 is configured of, for example, a vision sensor, a force sensor, a vibration sensor, and the like. The robot controller 30 may correct a position in the operation program 16 on the basis of information from the sensor 23.

Figure 2:
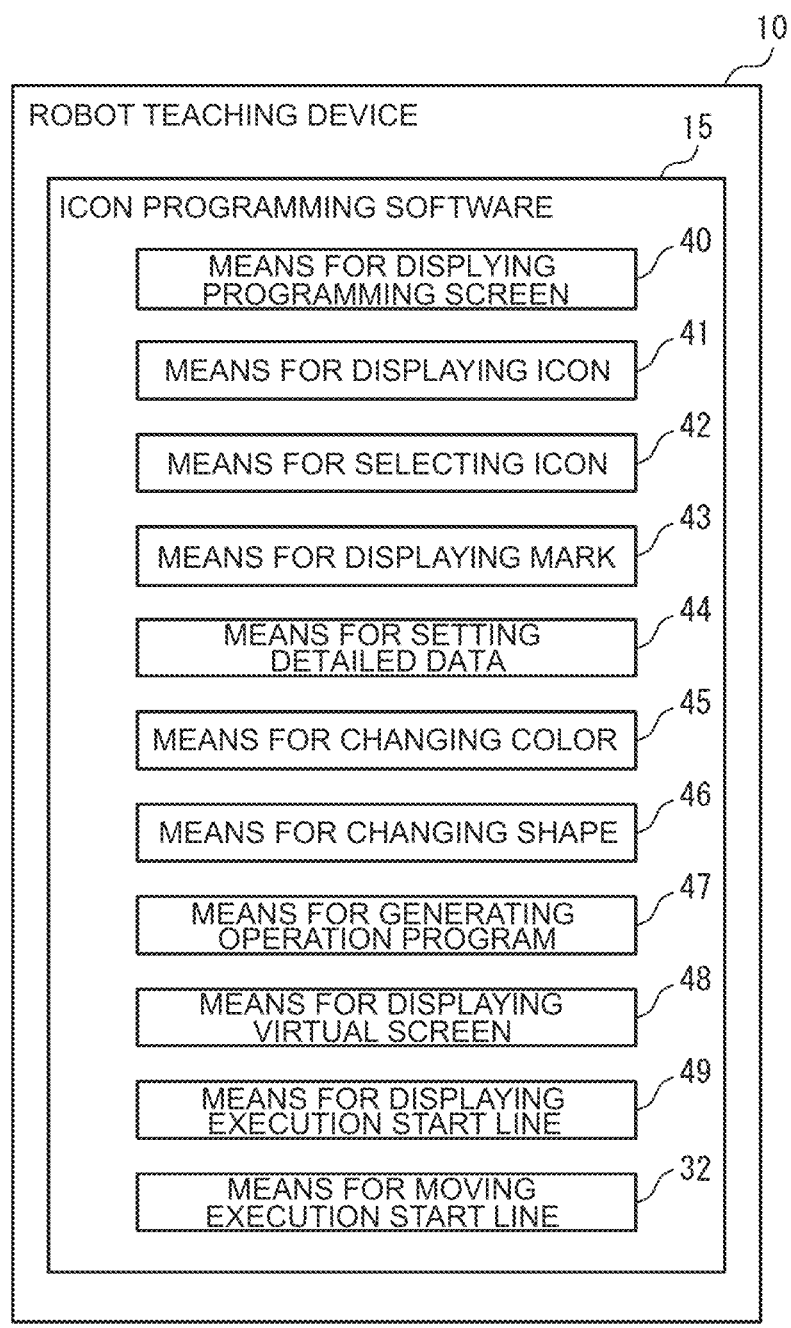
FIG. 2 is a function block diagram of the robot teaching device according to an embodiment.

FIG. 2 illustrates a function block of the robot teaching device 10. The icon programming software 15 causes the processor of the robot teaching device 10 to function as means 40 for displaying a programming screen, means 41 for displaying an icon, means 42 for selecting an icon, and means 43 for display a mark. Furthermore, the icon programming software 15 may cause the processor to function as means 44 for setting a detailed data, means 45 for changing a color, means 46 for changing a shape, means 47 for generating an operation program, means 48 for displaying a virtual screen, means 49 for displaying an execution start line, and means 32 for moving an execution start line. The respective means will be described in detail below.

Figure 3:
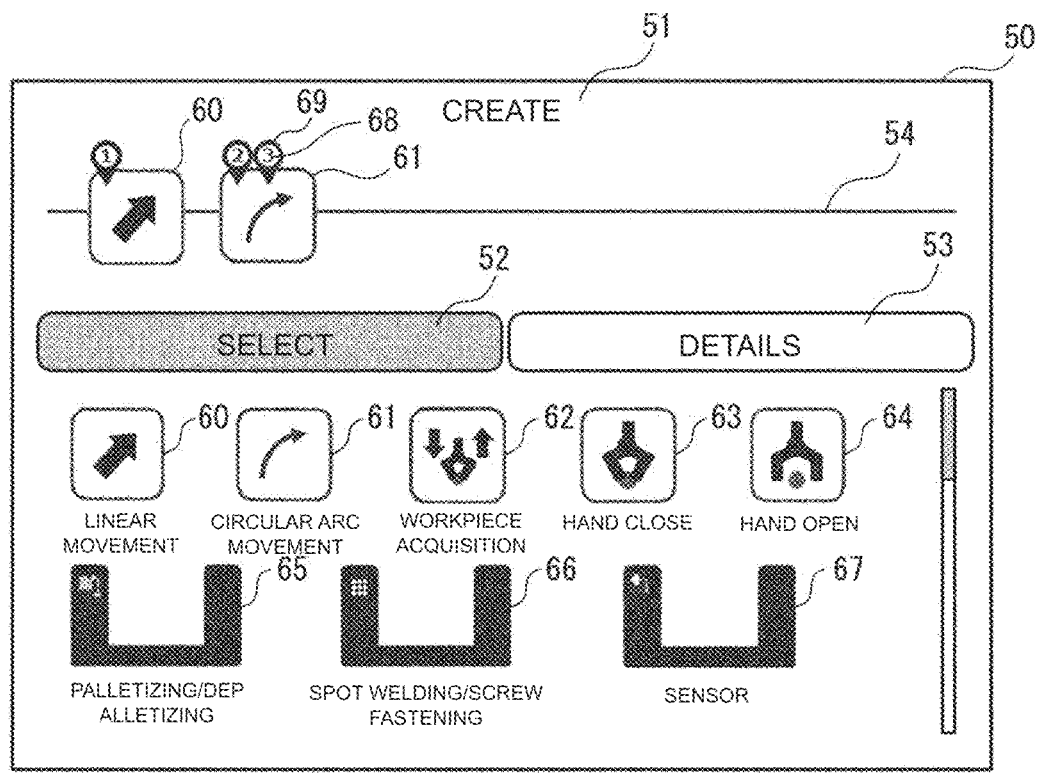
FIG. 3 is a diagram illustrating an example of a programming screen.

FIG. 3 illustrates an example of a programming screen 50. The processor 11 functions as means 40 for displaying the programming screen, and displays the programming screen 50 on the display unit 12. The programming screen 50 preferably includes: a creation screen 51 on which the operation program 16 can be created by arranging icons on a time axis 54, each of which represents an operation instruction of the robot 20; a selection screen 52 on which one icon can be selected from among various icons 60 to 67 that are prepared beforehand, and a detail screen 53 on which detailed data of the icons 60 and 61 arranged on the creation screen 51 are set. Note that it is sufficient that the icons are arranged in a time series, and in this case, the time axis 54 need not be displayed.

The processor 11 also functions as means 41 for displaying the icon, and displays various icons 60 to 67 on the selection screen 52, each of which represents the operation instruction of the robot 20. Furthermore, the processor 11 functions as means 42 for selecting the icon, in which any one of the icons 60 to 67 is selected on the selection screen 52, and a replication of the icon is arranged on the time axis 54 of the creation screen 51.

The icons 60 to 67 preferably include instruction icons 60 to 64 each of which represents a low-function operation instruction, and high-function icons 65 to 67 each of which represents a high-function operation instruction. The instruction icons 60 to 64 include, for example, a linear movement instruction, a circular arc movement instruction, a workpiece acquisition instruction, a hand close instruction, a hand open instruction, and the like. The high-function icons 65 to 67 include, for example, an application instruction in which a predetermined operation pattern is repeated, a correction instruction based on information from the sensor 23, and the like. The high-function icons 65 to 67 each have a U shape, for example, and in a region surrounded by each of the high-function icons 65 to 67, one or a plurality of instruction icons 60 to 64 that teach the operation pattern can be arranged on the time axis 54. The arranged one or plurality of instruction icons 60 to 64 are corrected and used as the operation pattern of the application instruction, or corrected and used by the n correction instruction. The application instruction includes, for example, a palletizing instruction to stack workpieces on a pallet one by one, a depalletizing instruction to unload workpieces stacked on the pallet one by one, a spot welding instruction to perform welding at one or a plurality of welding points, a screw fastening instruction to fasten one or a plurality of screws, and the like.

Furthermore, the processor 11 functions as means 43 for displaying the mark, and in a case that the operation instruction includes a position, displays a mark 69 associated with the instruction on 60, the mark is associated with an identifier 68 of the position. In a case that the operation instruction includes a plurality of positions, the processor 11 preferably displays a plurality of marks 69 associated with one instruction icon 60. This makes it possible to visually and simply display on the instruction icon that one operation instruction includes the plurality of positions. The identifier 68 of the position is configured of, for example, a number, an alphabet, a combination thereof, or the like, and is identification information of the position commonly used in the operation program. Since the identifier 68 of the position is common in the operation program, the same identifier 68 can be designated in a case that the same position is desired to be used. Additionally, the mark 69 may be a pin mark that is stuck into the instruction icon 61, but other forms may be used, such as an arrow mark, a balloon mark, or the like.

Figure 4:
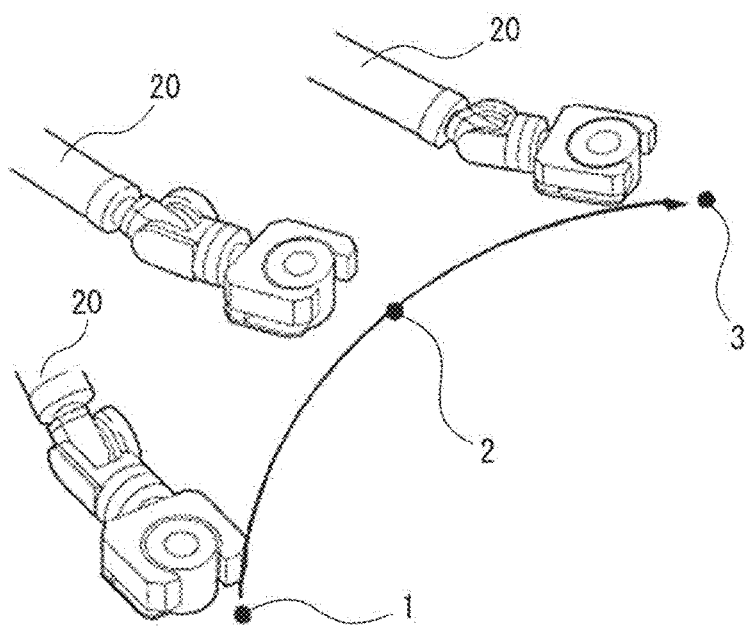
FIG. 4 is a perspective view illustrating an example of an operation instruction including a plurality of positions.

FIG. 4 illustrates a circular arc movement instruction as an example of an operation instruction including a plurality of positions. The circular arc movement instruction is an operation instruction in which the robot 20 arcuately moves from position 1 of a starting point though position 2 to position 3, and includes two positions of the position 2 and the position 3. As illustrated in FIG. 3, when the instruction icon 61 arranged on the time axis 54 is selected, the processor 11 functions as means 44 for setting the detailed data and displays the detail screen 53 for setting detailed data of the instruction icon 61.

Figure 5:
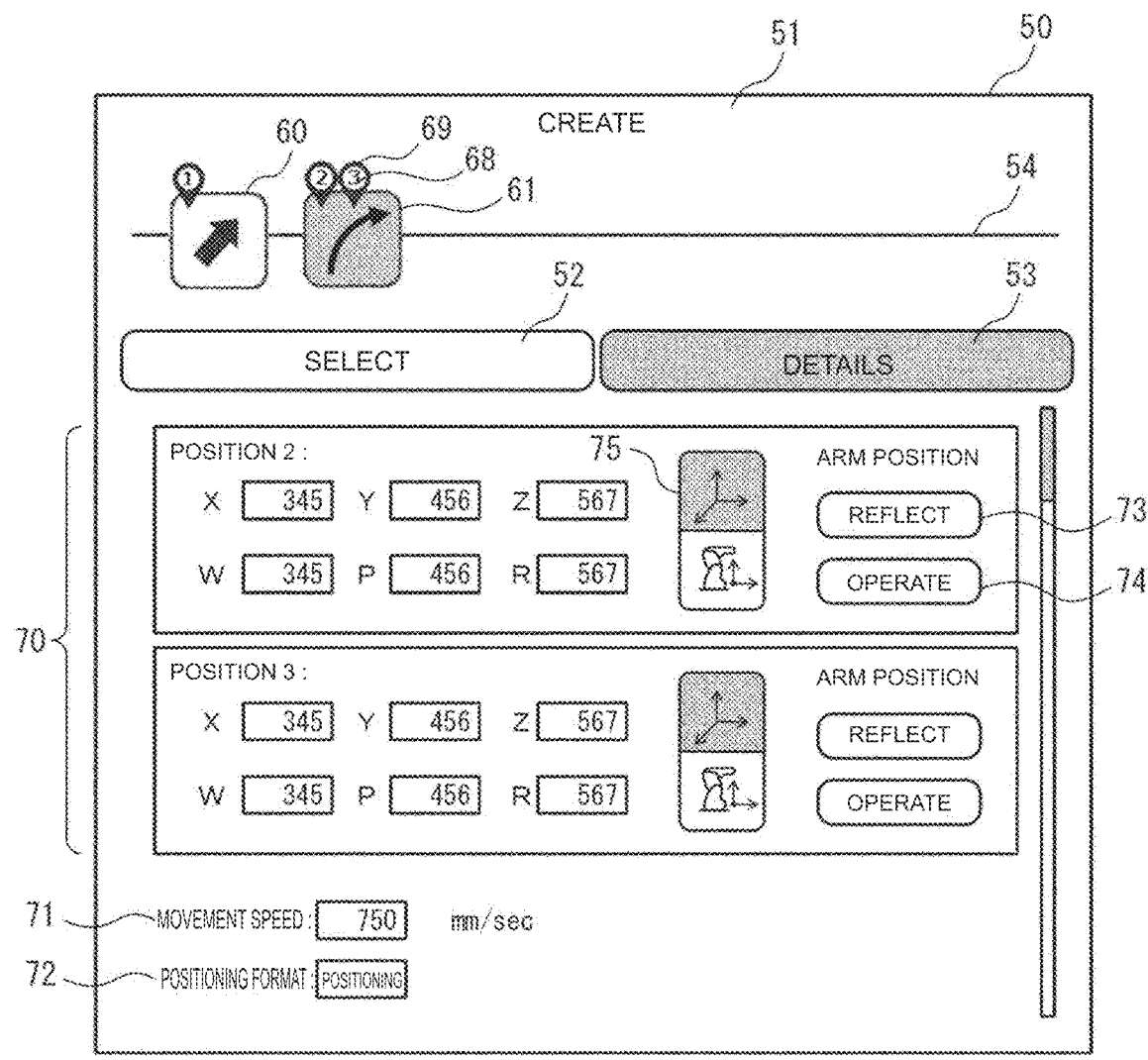
FIG. 5 is a diagram illustrating an example of a detail screen of the operation instruction in FIG. 4.

FIG. 5 illustrates an example of the detail screen of the operation instruction in FIG. 4. The detailed data of the circular arc movement instruction include two positions 70 of the position 2 and the position 3, a movement speed 71 of the robot, a positioning format 72 after movement, and the like. The position 70 may be an automatically inputted initial value, but may be a present location of a real robot or a virtual robot set by depressing a "reflect" button 73 of an arm position, or may be a position manually inputted by a user. Furthermore, the position 70 may be switched among various coordinate systems, such as a user coordinate system, a robot coordinate system, or the like, for example, by depression of a switching button 75. Depressing "operate" button 74 at the arm position makes it possible to operate the real robot or the virtual robot to the set position 70 to confirm the position of the robot. The positioning format includes a "positioning" mode for pausing after movement, a "smooth" mode for continuously moving to a next operation instruction, and the like.

Figure 6:
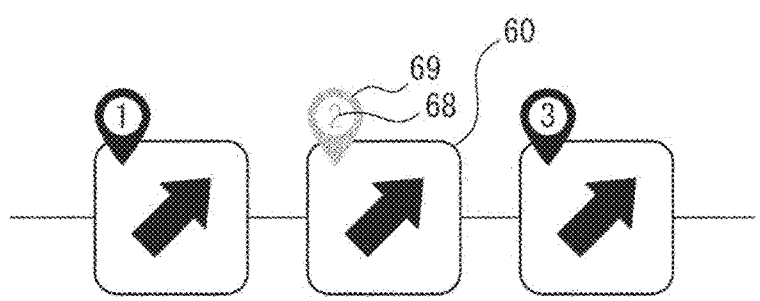
FIG. 6 is a diagram illustrating a state in which colors of an identifier of the position and a mark are changed.

Furthermore, the processor 11 may function as means 45 for changing the color, and in a case that the position 70 on the detail screen 53 are not inputted or are wrong, preferably changes the color of at least one of the identifier 66 of the position and the mark 69. FIG. 6 illustrates a state in which the colors of the identifier 68 of the position and the mark 69 are changed. This makes it possible to individually realize that the position 2 is not inputted or is wrong, on the instruction icon 60.

Figure 7:
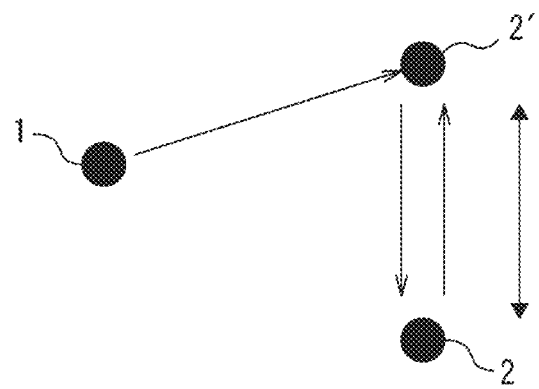
FIG. 7 is a perspective view illustrating an example of an operation instruction in which the position is corrected and used.
Figure 8:
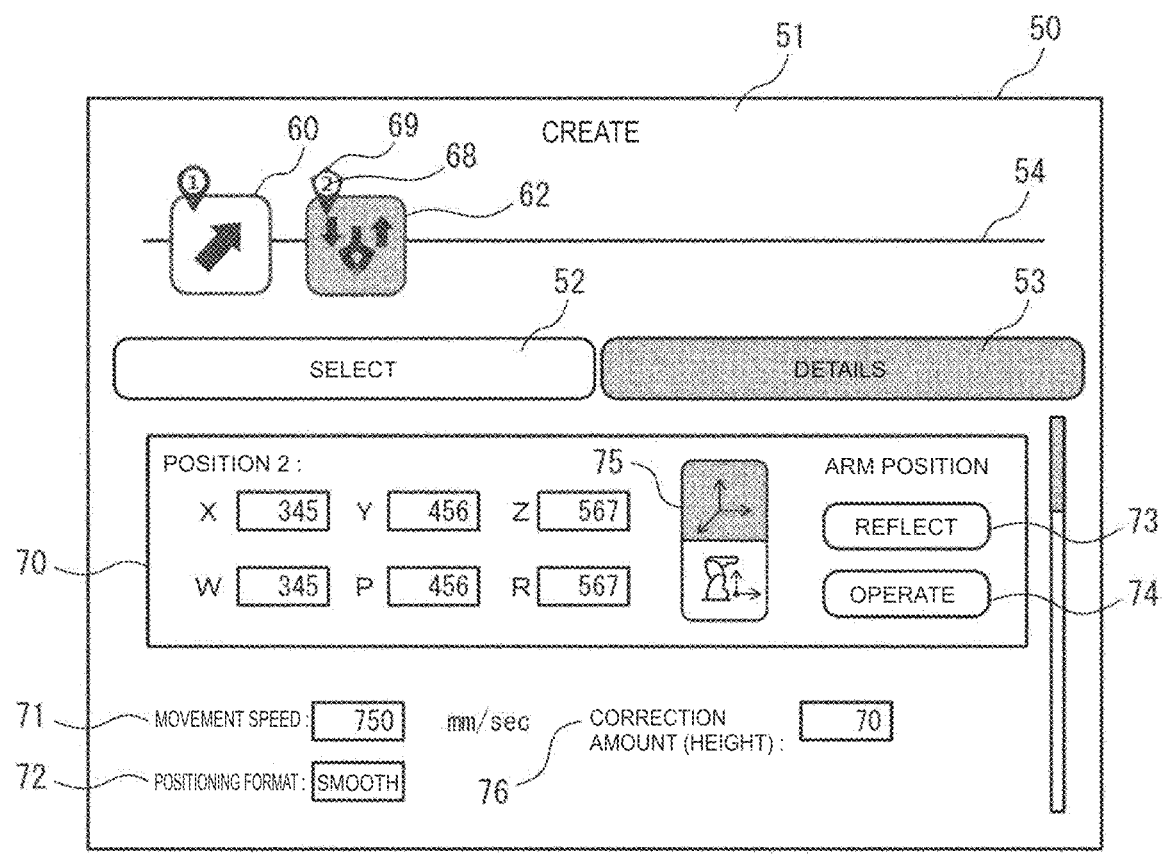
FIG. 8 is a diagram illustrating an example of a setting screen of the operation instruction in FIG. 7.

In addition, the processor 11 may function as means 46 for changing the shape, and preferably changes the shape of the mark 69 in a case that the position 70 set on the detail screen 53 are corrected and used. FIG. 7 illustrates a workpiece acquisition instruction as an example of an operation instruction in which a position is corrected and used. The workpiece acquisition instruction is an operation instruction in which the robot moves from position 1 of a starting point through position 2' of a standby position to position 2 where the workpiece is acquired. FIG. 8 illustrates an example of a setting screen of the operation instruction in FIG. 7. The detailed data of the workpiece acquisition instruction include a correction amount 76 (height) of the position 70 in addition to the position 70 of the position 2, the movement speed 71 of the robot, and the positioning format 72 after movement. When the workpiece acquisition instruction is executed, the position 70 of the position is corrected on the basis of the correction amount 76 (height), and the position 2" is calculated. In a case that the position 70 is corrected and used in this manner, the shape of the nark 69 is preferably changed, for example, from a pin mark to a rhombic-shaped mark. This makes it possible to visually and simply realize that the position 70 is corrected and used, on the instruction icon 60.

Figure 9:
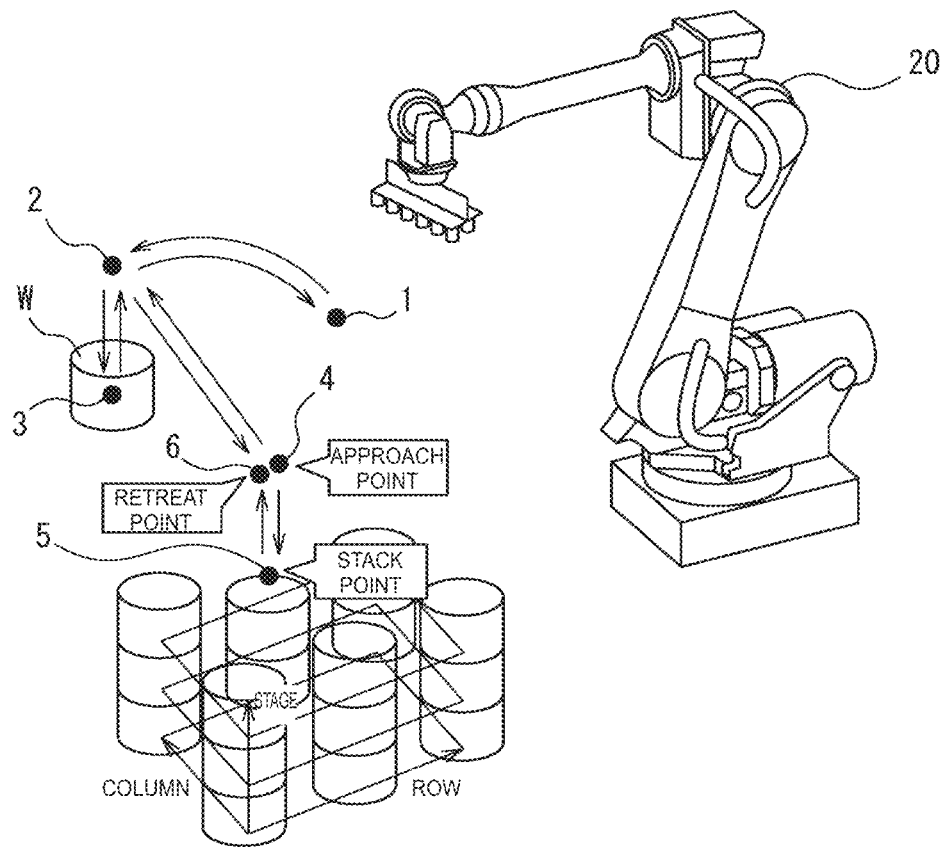
FIG. 9 is a perspective view illustrating an example of an application instruction that corrects and uses position.

Furthermore, the processor 11 preferably changes the shape of the mark 69 even in a case that the position 70 is corrected and used in accordance with the application instruction that corrects and uses the position 70. FIG. 9 illustrates a palletizing instruction as an example of the application instruction that corrects and uses the position. The palletizing instruction is, as described above, an application instruction that the robot 20 acquires a workpiece W and stacks it on a pallet one by one, for example, the robot 20 moves from position 1 of the standby position to position 2, moves to position 3 where the workpiece W is acquired, returns to the position 2 after having closed a hand, moves to position 4 which is a pallet approach point, moves to position 5 which is a stack point, moves to position 6 of a retreat point after having opened the hand, and returns through the position 2 to the position 1 of the standby position.

Figure 10:
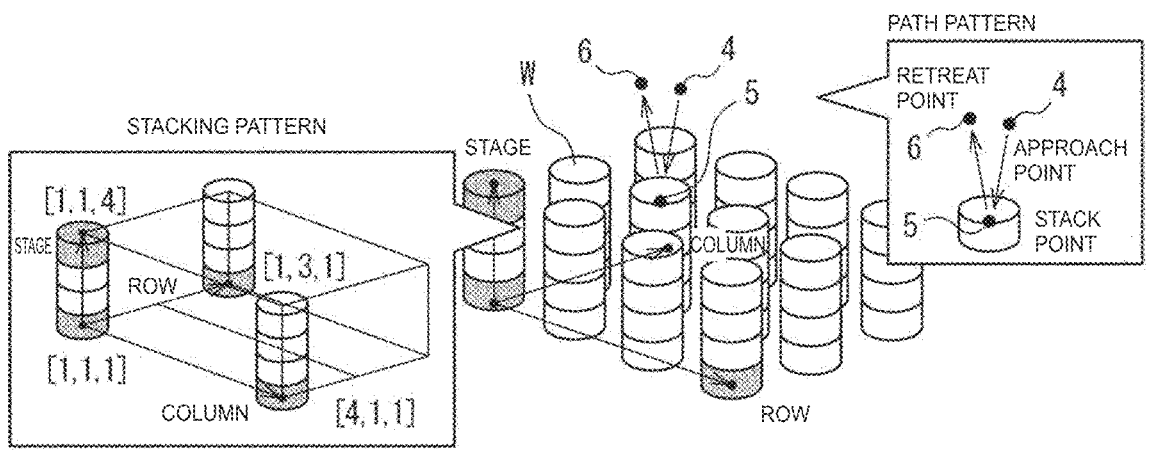
FIG. 10 is a perspective view illustrating an example of a stacking pattern and a path pattern of a palletizing instruction.

FIG. 10 illustrates an example of a stacking pattern and an example of a path pattern of the palletizing instruction. In the palletizing instruction, the workpieces are stacked in good order simply by setting the stacking pattern and the path pattern. The stacking pattern is determined on the basis of, for example, the number of rows/columns/stages, the position of a representative point, and the like. In addition, the path pattern is determined on the basis of, for example, positions of the approach point, the stack point, and the retreat point, and the like. The three positions of the path pattern may be indicated by relative positions and are corrected and used on the basis of detailed data of the stacking pattern.

Figure 11:
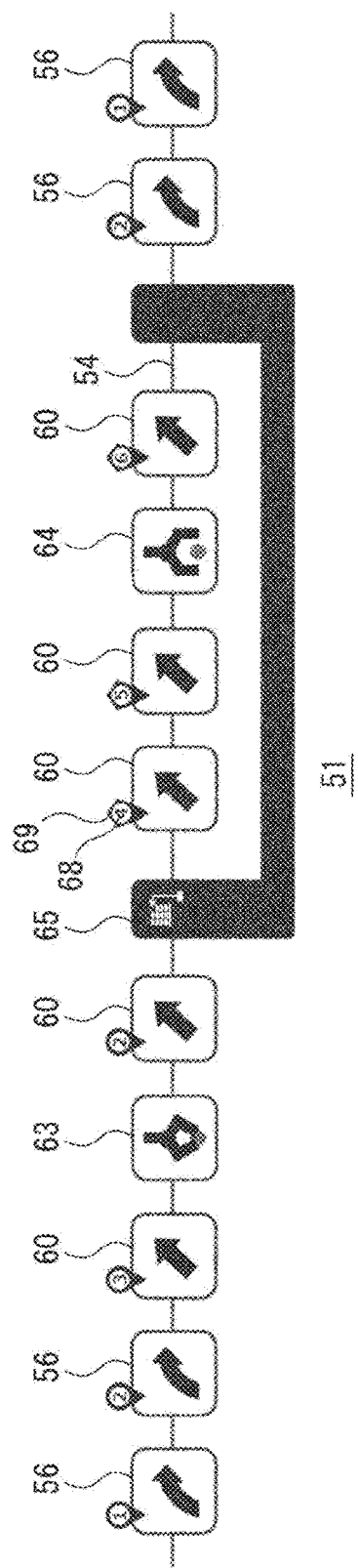
FIG. 11 is a diagram illustrating an example of an icon group representing the palletizing instruction in FIG. 9.

FIG. 11 illustrates an example of an icon group representing the palletizing instruction in FIG. 9. The palletizing instruction is programmed by arranging the high-function icon 65 representing the palletizing instruction on the time axis 54 of the creation screen 51, and arranging the instruction icons 60 representing the path pattern in the region surrounded by the high-function icon 65. In the present example, in the region surrounded by the high-function icon 65, three instruction icons 60 for performing linear movement to the approach point, the stack point, and the retreat point, which are the path pattern, are arranged. The detailed data of the path pattern can be set on the detail screen by selecting the instruction icon 60, and the detailed data of the stacking pattern can be set on the detail screen by selecting the high-function icon 65.

Figure 12:
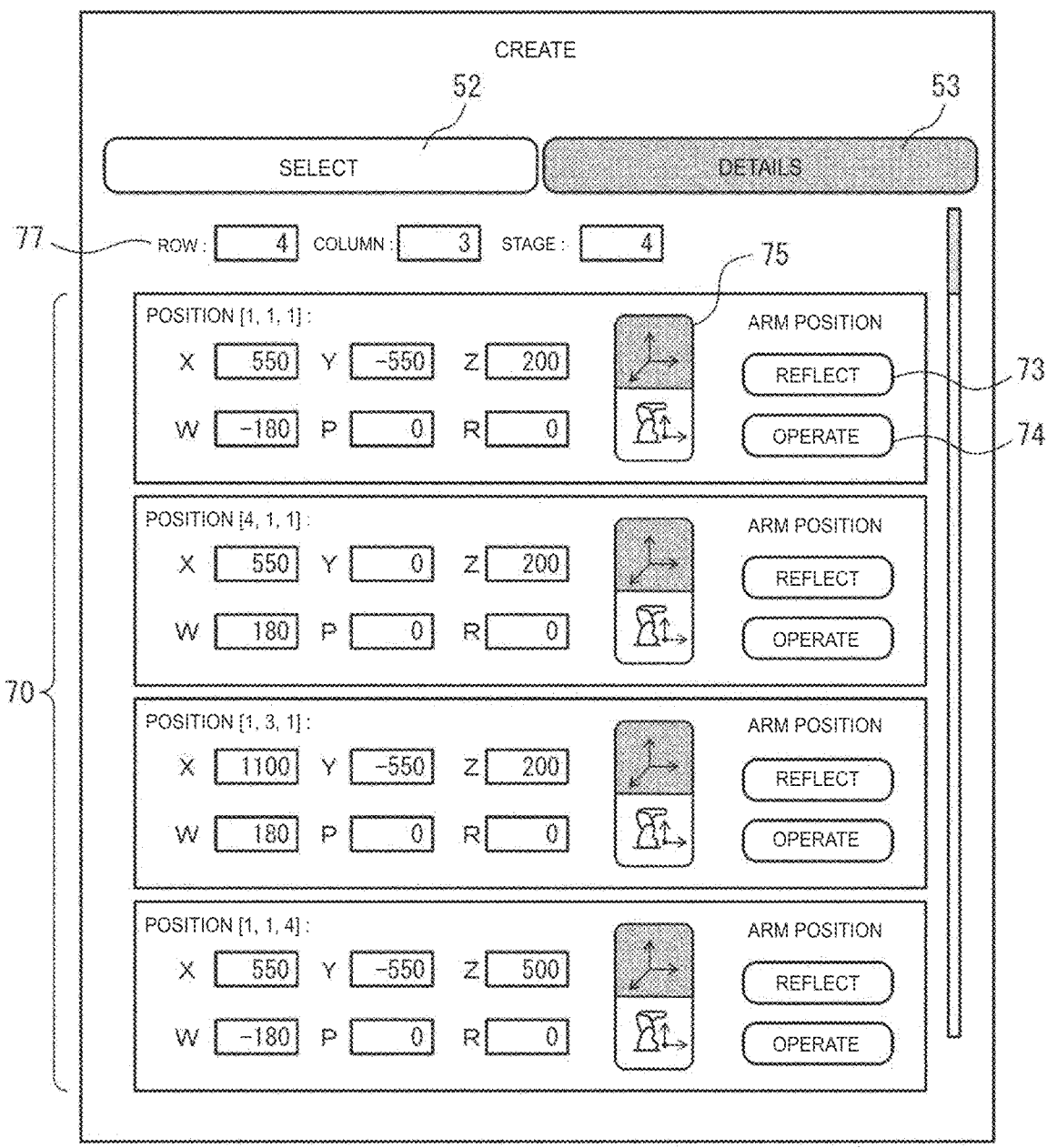
FIG. 12 is a diagram illustrating an example of a detail screen of a high-function icon in FIG. 11.

FIG. 12 illustrates an example of the detail screen 53 of the high-function icon 65 in FIG. 11. In the detail screen 53 of the high-function icon 65 that represents the palletizing instruction, the detailed data of the stacking pattern are set. The detailed data include, for example, the number 77 of rows/columns/stages, the position 70 of the representative point, and the like.

Figure 13:
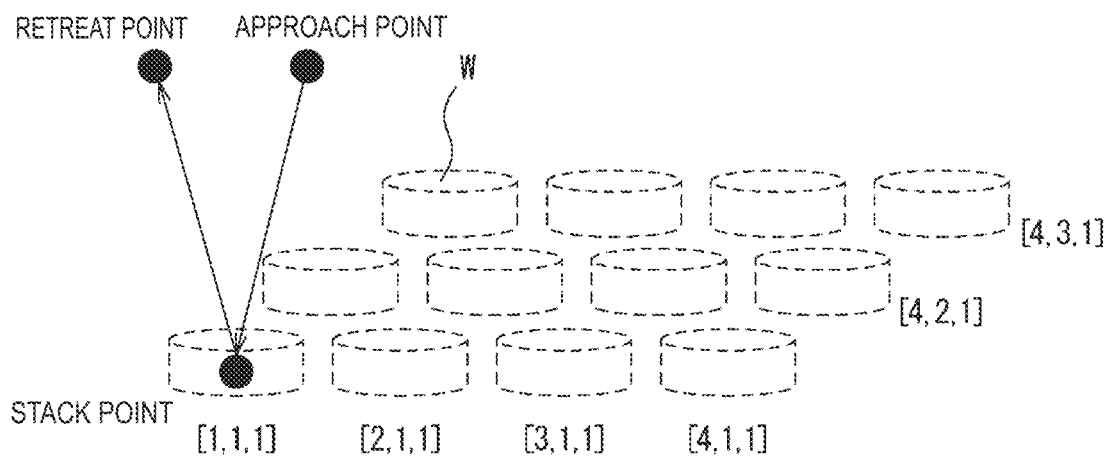
FIG. 13 is a diagram illustrating a state in which a position of a path pattern is corrected and used.
Figure 14:
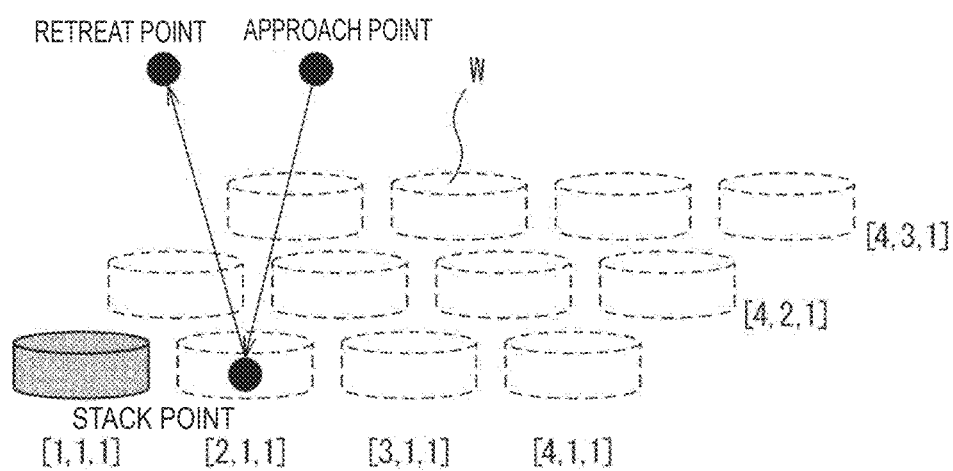
FIG. 14 is a diagram illustrating a state in which a position of a path pattern is corrected and used.

FIG. 13 and FIG. 14 each illustrate a state in which the positions of the path pattern are corrected and used. For example, in a first execution, as illustrated in FIG. 13, the position 70 of the path pattern is corrected or the basis of the stacking pattern such that the position [1, 1, 1] serves as the stack point. For example, in a second execution, the position 70 of the path pattern is corrected on the basis of the stacking pattern such that the position [2, 1, 1] serves as the stack point. In this manner, the path pattern is corrected by applying an offset on the position 70 of the path pattern in accordance with the stacking pattern.

FIG. 11 is referred to again. Since the three positions of the path pattern are corrected and used on the basis of the stacking pattern, the processor 11 changes the shapes of the marks 69 on the three instruction icons 60 arranged in the region surrounded by the high-function icon 65, for example, from a pin mark to a rhombic-shaped mark. This makes it possible to visually and simply realize that the position of the instruction icon 60 arranged in the region surrounded by the high-function icon 65 are corrected and used.

Note that the processor 11 preferably changes the shape of the mark 69 even in a case that the position is corrected and used in accordance with the correction instruction based on information from the sensor 23 illustrated in FIG. 1. This also makes it possible to visually and simply realize that the position is corrected and used on the basis of the information from the sensor 23.

Figure 15:
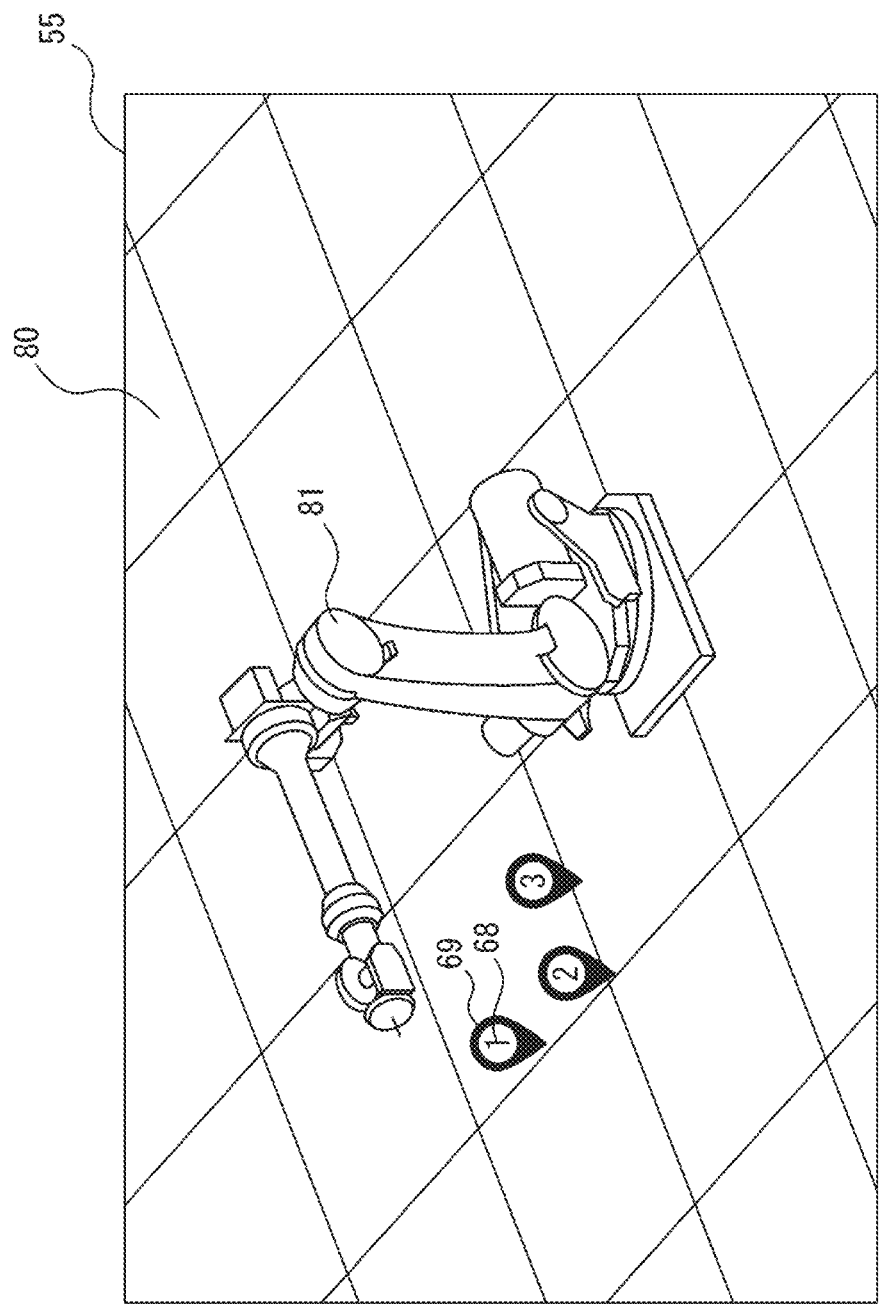
FIG. 15 is a diagram illustrating a virtual screen on which an identifier of the position and a mark are arranged.

Referring again to FIG. 2, the processor 11 functions as means 47 for generating the operation program, and generates an operation program when programming has ended. Furthermore, the processor 11 may function as means 48 for displaying the virtual screen, and display a virtual screen on which an identifier of position and a mark are arranged at a position indicated by the position 70 on a virtual space. FIG. 15 illustrates a virtual screen 55 on which the identifier 68 of the position and the mark 69 are arranged. A virtual robot 81 is further arranged in a virtual space 80, and simulation of the generated operation program can be performed by the virtual robot 81. This makes it possible to realize the position 70 used in the operation program as graphic information.

Figure 16:
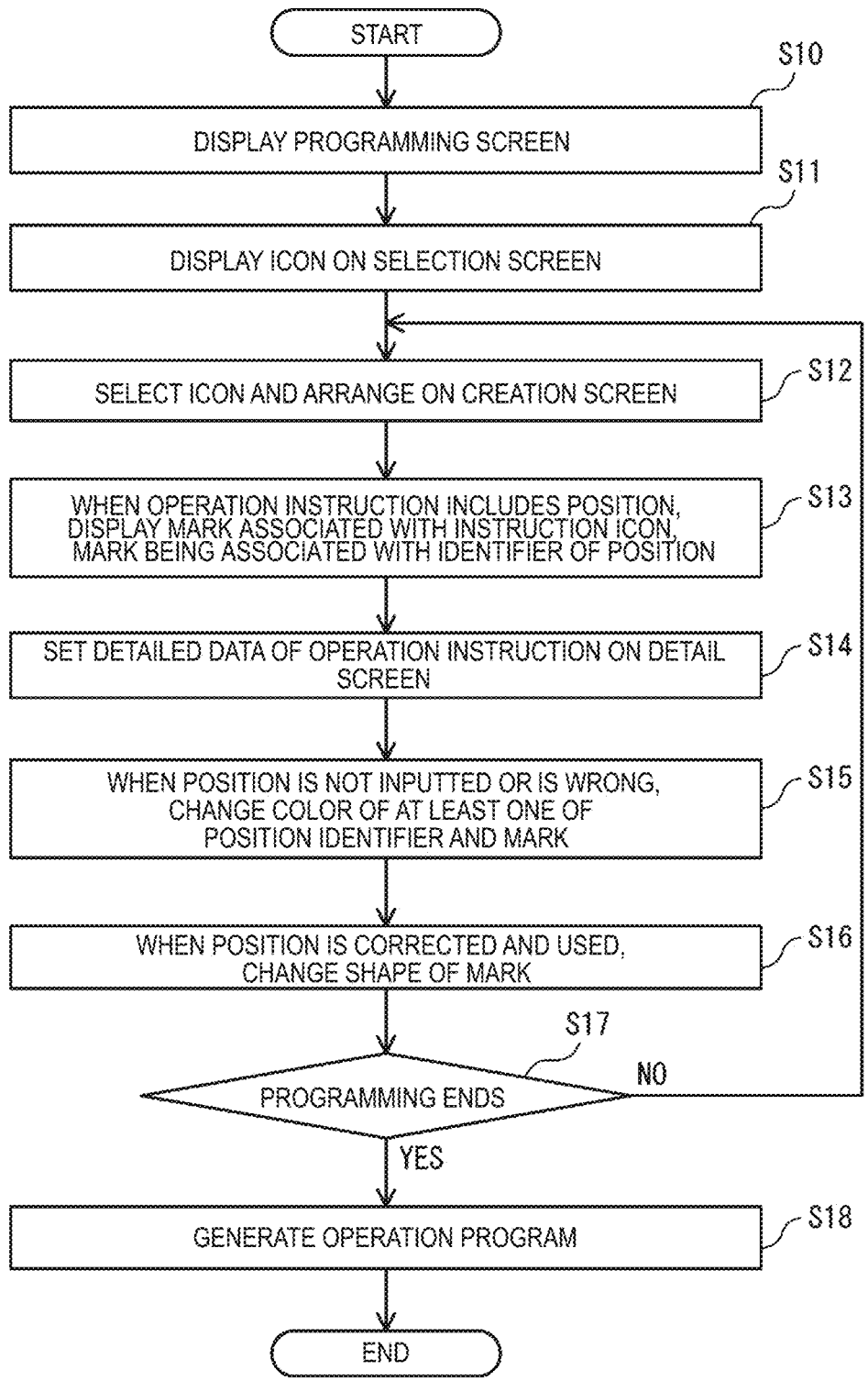
FIG. 16 is a flowchart illustrating the operation of the robot teaching device according to an embodiment.

FIG. 16 illustrates an example of the operation of the robot teaching device according to the present embodiment. In step S10, the programming screen including the selection screen, the creation screen, the detail screen, and the like is displayed. In step S11, various icons (instruction icons, high-function icons, and the like) are displayed on the selection screen. In step S12, the icon is selected and a replication of the icon is arranged on the creation screen. In step S13, in a case that the operation instruction includes a position, the mark associated with the identifier of the position is displayed to be associated with the instruction icon. At this time, in a case that one operation instruction includes a plurality of positions, it is preferable to display a plurality of marks associated with one instruction icon. This makes it possible to visually and simply display that one operation instruction includes a plurality of positions, on the instruction icon.

In step S14, detailed data of the operation instruction (position, movement speed, positioning format, and the like) are set on the detail screen. In step S15, in a case that the position is not inputted or are wrong, the color of at least one of the identifier of the position and the mark is changed. This makes it possible to individually realize that the position is not inputted or are wrong, on the instruction icon. In step S16, in a case that the position is corrected and used, the shape of the mark is changed. This makes it possible to visually and simply realize that the position is corrected and used, on the instruction icon.

In step S17, it is determined whether or not the programming has ended. In a case that the programming has not ended (NO in step S17), the process returns to step S12, and the process of arranging the icon on the time axis of the creation screen is repeated. In a case that the programming has ended (YES in step S17), the operation program is generated in step S18.

Figure 17A:
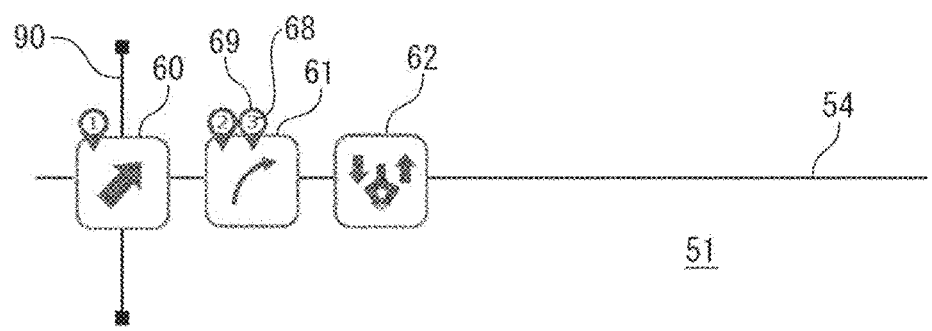
FIG. 17A is a diagram illustrating an example of an execution start line.
Figure 17B:
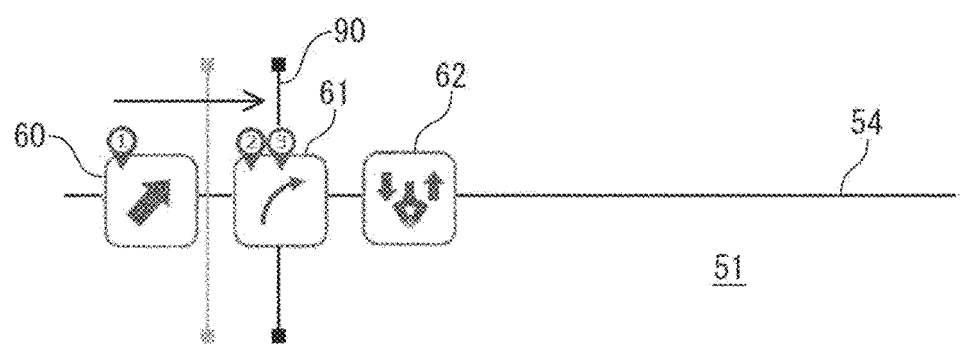
FIG. 17B is a diagram illustrating an example of the execution start line.
Figure 17C:
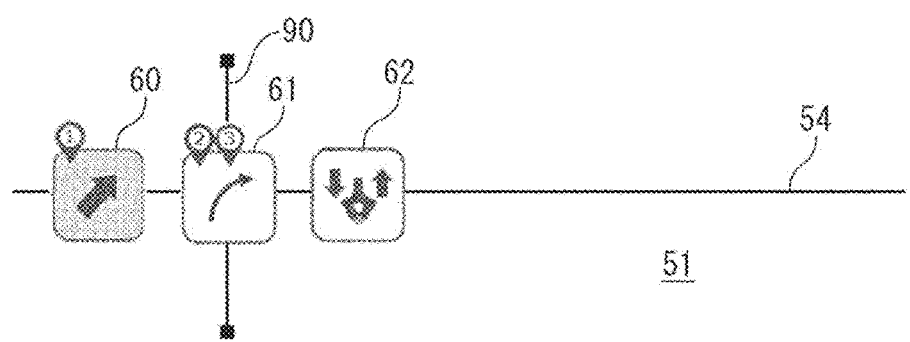
FIG. 17C is a diagram illustrating an example of the execution start line.

FIG. 17A to FIG. 17C each illustrate an example of an execution start line 90. As illustrated in FIG. 17A, the processor 11 may function as means 49 for displaying the execution start line, and display the execution start line 90 indicating an execution start position in the operation program on the instruction icon 60. For example, the execution start line 90 may take a form of a line orthogonal to the time axis 54. The instruction icons 60 to 62 arranged on the time axis 54 are each assigned an execution number indicating an execution position in the operation program. Then, the processor 11 displays the execution start line 90 on the instruction icon 60 with the execution number (hereinafter referred to as an execution start number) indicating the execution start position in the operation program. In the initial setting, the execution start line 90 is preferably displayed on the first instruction icon 60.

As illustrated in FIG. 17B, the processor 11 may function as means 32 for moving the execution start line, and move the execution start line 90 onto another instruction icon 61 in accordance with manipulation such as a dragging or the like by a user. Furthermore, the processor 11 may move the execution start line 90 onto the instruction icon that is closest to a position manipulated by the user such as a double click (or double tap) or the like on the time axis 54 or on the creation screen 51. The movement of the execution start line 90 in accordance with the manipulation such as double click (or double tap) or the like makes it possible to easily change the execution start position even in a long operation program. At this time, the execution start number is changed to the execution number of the instruction icon to which the execution start line 90 has been moved.

When the generated operation program is executed, execution of the operation program is started from the position of the execution start line 90. During execution of the operation program, the processor 11 preferably moves the execution start line 90 in accordance with the execution state of the operation program. The movement of the execution start line 90 in accordance with execution of the operation program as described above makes it possible to visually realize which portion of the operation program is executing. Additionally, at the end of the operation program, the processor 11 stops the executions start line 90 on the instruction icon that is being executed at that time. The next execution start number is set to the execution number of its instruction icon.

When the operation program being executed is paused, the processor 11 pauses the execution start line 90 on the instruction icon that is being executed at that time. The next execution start number is set to the execution number of its instruction icon. When the operation program is executed again, the operation instruction during execution is resumed. In a case that the position of the execution start line 90 is changed in a state in which the operation program is paused, the processor 11 preferably displays a confirmation screen for confirming whether or not the execution start number may be changed from the instruction icon that is paused to another instruction icon. When "Yes" is selected on the confirmation screen, the next execution start number is changed to the execution number of the instruction icon to which the execution start line 90 has been moved, and when "No" is selected on the confirmation screen, the next execution start number is not changed. In the case that "No" is selected, since the actual execution start number and the position of the execution start line 90 differs from each other, when the operation program is started again, the confirmation screen is preferably displayed again for confirming whether or not the execution start number may be changed (whether or not the operation program may be started from the instruction icon on which the current execution start line 90 is located). Furthermore, in the state in which "No" is selected, in a case that the execution start line 90 is further moved to another instruction icon, the confirmation screen may be displayed for confirming whether or not the execution start number may be changed from the instruction icon that is paused to the other instruction icon. Once the execution start number is changed from the instruction icon that is paused to the other instruction icon, the confirmation screen may preferably be not displayed thereafter even if the position of the execution start line 90 is changed. This improves the convenience for the user.

Providing the execution start line 90 as described above makes it possible to set the execution start position in the operation program without selecting the instruction icon 61. On the other hand, in a case that the instruction icon 60 is selected as illustrated in FIG. 17C, it is possible to set the detailed data of the operation instruction without changing the execution start position in the operation program. The instruction icon 60 can simultaneously have a status of the execution state and a status during editing, but in the present embodiment, the instruction icon 60 has the status during editing and the execution start line 90 has the status of the execution state. Since the execution start line 90 can be moved as desired by the user, only the status of the execution state can be changed without changing the status during editing. Furthermore, when the execution start line 90 is not moved, the content of the instruction icon 60 can be edited without changing the status of the execution state. In other words, when selecting the instruction icon, it is possible to prevent the execution start position from being unintentionally changed.

According to the embodiment described above, the convenience of the icon programming function is improved.

A program that is executed by the processor described above may be provided in a state where the program has been recorded in a computer-readable non-transitory recording medium, such as a CD-ROM.

Although various embodiments have bees described in this specification, the present invention is not limited to the above-described embodiments, and it is to be understood that various changes can be made without departing from the scope of the appended claims.

The invention claimed is:

1. A robot teaching device for generating an operation program of a robot by arranging an instruction icon that represents an operation instruction of the robot, the robot teaching device comprising:
 a display; and
 a processor configured to cause the display to simultaneously display a plurality of marks on the instruction icon in a case that the operation instruction includes a plurality of positions, wherein the mark is associated with an identifier of the position,
 wherein the instruction icon includes at least one of a linear movement instruction, a circular arc movement instruction, a workpiece acquisition instruction, a hand close instruction, or a hand open instruction.

2. The robot teaching device of claim 1, wherein the mark is a pin mark stuck into the instruction icon.

3. The robot teaching device of claim 1, wherein the processor is further configured to cause the display to change a color of at least one of the identifier of the information relating to the position or the mark in a case that the information relating to the position is not inputted or is wrong.

4. The robot teaching device of claim 1, wherein the processor is further configured to cause the display to change a shape of the mark in a case that the information relating to the position is corrected and used.

5. The robot teaching device of claim 4, wherein the processor is further configured to set detailed data including a correction amount of the information relating to the position.

6. The robot teaching device of claim 4, wherein the processor is configured to cause the display to change the shape of the mark in accordance with the information relating to the position being corrected and used in accordance with an application instruction that corrects and uses the information relating to the position or in accordance with a correction instruction based on information from a sensor.

7. The robot teaching device of claim 6, wherein the processor is further configured to cause the display to display a high-function icon that represents the application instruction or the correction instruction.

8. The robot teaching device of claim 1, wherein the processor is further configured to cause the display to display a virtual screen on which the identifier of the information relating to the position and the mark are arranged at a position indicated by the information relating to the position on a virtual space.

9. The robot teaching device of claim 1, wherein the processor is further configured to cause the display to display an execution start line on the instruction icon, wherein the execution start line indicates an execution start position in the operation program.

10. A robot teaching device for generating an operation program of a robot by arranging an instruction icon that represents an operation instruction of the robot, the robot teaching device comprising:
 a display; and
 a processor configured to cause the display to:
 simultaneously display a mark on the instruction icon in a case that the operation instruction includes information relating to a position, wherein the mark is associated with an identifier of the information relating to the position; and
 change a shape of the mark in accordance with the information relating to the position being corrected and used, wherein
 the instruction icon includes at least one of a linear movement instruction, a circular arc movement instruction, a workpiece acquisition instruction, a hand close instruction, or a hand open instruction.

11. The robot teaching device of claim 10, wherein the processor is configured to cause the display to change the shape of the mark in accordance with the information relating to the position being corrected and used in accordance with an application instruction that corrects and uses the information relating to the position or in accordance with a correction instruction based on information from a sensor.

12. The robot teaching device of claim 10, wherein the processor is further configured to cause the display to display a virtual screen on which the identifier of the information relating to the position and the mark are arranged at a position indicated by the information relating to the position on a virtual space.

13. The robot teaching device of claim 10, wherein the processor is further configured to cause the display to display an execution start line on the instruction icon, wherein the execution start line indicates an execution start position in the operation program.

14. A robot teaching device for generating an operation program of a robot by arranging an instruction icon that represents an operation instruction of the robot, the robot teaching device comprising:
- a display; and
- a processor configured to cause the display to display an execution start line on the instruction icon, wherein
  - the execution start line indicates an execution start position in the operation program, and
  - the execution start line is moved in accordance with an execution state of the operation program, and the operation program is executable from the execution start line which is arranged in a middle of the operation program.

15. The robot teaching device of claim 14, wherein the processor is configured to cause the display to move the execution start line onto another instruction icon in accordance with manipulation by a user.

* * * * *